US010623929B1

(12) United States Patent
Harpale

(10) Patent No.: US 10,623,929 B1
(45) Date of Patent: Apr. 14, 2020

(54) METHOD AND APPARATUS FOR SHARED MOBILE DEVICE APP WITH UNIQUE BUSINESS FUNCTION ADAPTATION AND RENDERING

(71) Applicant: Mahesh Harpale, Mountain Lakes, NJ (US)

(72) Inventor: Mahesh Harpale, Mountain Lakes, NJ (US)

(*) Notice: Subject to any disclaimer, the term of this patent is extended or adjusted under 35 U.S.C. 154(b) by 200 days.

(21) Appl. No.: 15/675,592

(22) Filed: Aug. 11, 2017

Related U.S. Application Data

(60) Provisional application No. 62/373,706, filed on Aug. 11, 2016.

(51) Int. Cl.
*H04W 4/60* (2018.01)
*H04L 29/08* (2006.01)
*H04L 29/06* (2006.01)
*H04W 12/06* (2009.01)

(52) U.S. Cl.
CPC .............. *H04W 4/60* (2018.02); *H04L 63/083* (2013.01); *H04L 67/306* (2013.01); *H04L 67/34* (2013.01); *H04W 12/06* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 8,595,082 B2 * | 11/2013 | Skutta | G06Q 30/08 705/26.1 |
| 8,719,258 B2 * | 5/2014 | Huang | G06Q 10/10 707/722 |
| 8,762,556 B2 | 6/2014 | Priyadarshan et al. | |
| 9,003,064 B2 * | 4/2015 | Margo | G06Q 30/06 709/249 |
| 9,026,631 B2 * | 5/2015 | Burckart | G06Q 50/01 709/223 |
| 9,451,043 B2 | 9/2016 | Zao et al. | |
| 9,621,600 B2 | 4/2017 | Yu et al. | |
| 2002/0161646 A1 * | 10/2002 | Gailey | G06Q 30/0261 705/14.64 |
| 2005/0044007 A1 * | 2/2005 | Shitomi | G06F 9/445 705/26.1 |
| 2008/0172344 A1 * | 7/2008 | Eager | G06Q 30/02 705/80 |
| 2009/0125800 A1 | 5/2009 | Chen et al. | |
| 2010/0223157 A1 * | 9/2010 | Kalsi | G06Q 30/06 705/26.1 |
| 2012/0311462 A1 * | 12/2012 | Devecka | H04W 4/21 715/753 |
| 2014/0080519 A1 * | 3/2014 | Ahmed | H04W 4/04 455/456.3 |

(Continued)

*Primary Examiner* — Kenny S Lin

(57) ABSTRACT

The present invention provides a new and innovative way to provide a method for a small business or any entity to utilize a shared mobile app platform with unique business function adaptation and dynamic rendering. Using the method presented the small business save time, effort, resources, and monetary investments that would be required to develop and maintain an independent mobile app and can still keep business function uniqueness in the shared app. Additionally, the consumer can save time, effort, and resources to search, download, and install a new app and still achieve personalized service offered by unique app and process flow rendering.

8 Claims, 11 Drawing Sheets

OPERATIONS FLOW EXAMPLE

(56) References Cited

U.S. PATENT DOCUMENTS

Figure 1:
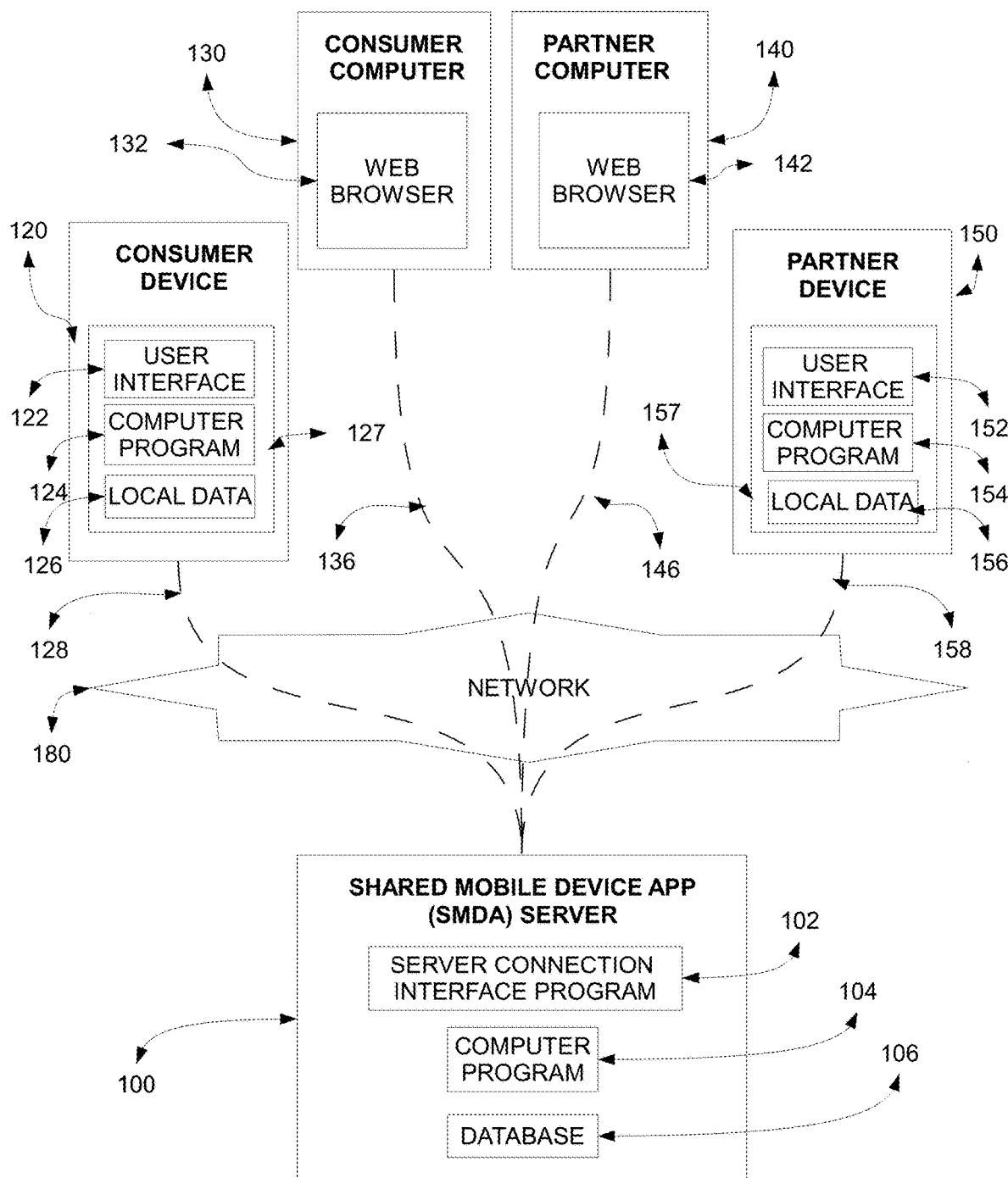

| | | | |
|---|---|---|---|
| 2015/0046259 A1* | 2/2015 | Hicken | G06Q 30/0256 705/14.54 |
| 2016/0048900 A1* | 2/2016 | Shuman | G06Q 30/0631 705/7.33 |
| 2016/0132948 A1* | 5/2016 | Saveliev | G06Q 30/0611 705/26.4 |

* cited by examiner

FIG. 2  OPERATIONS FLOW EXAMPLE
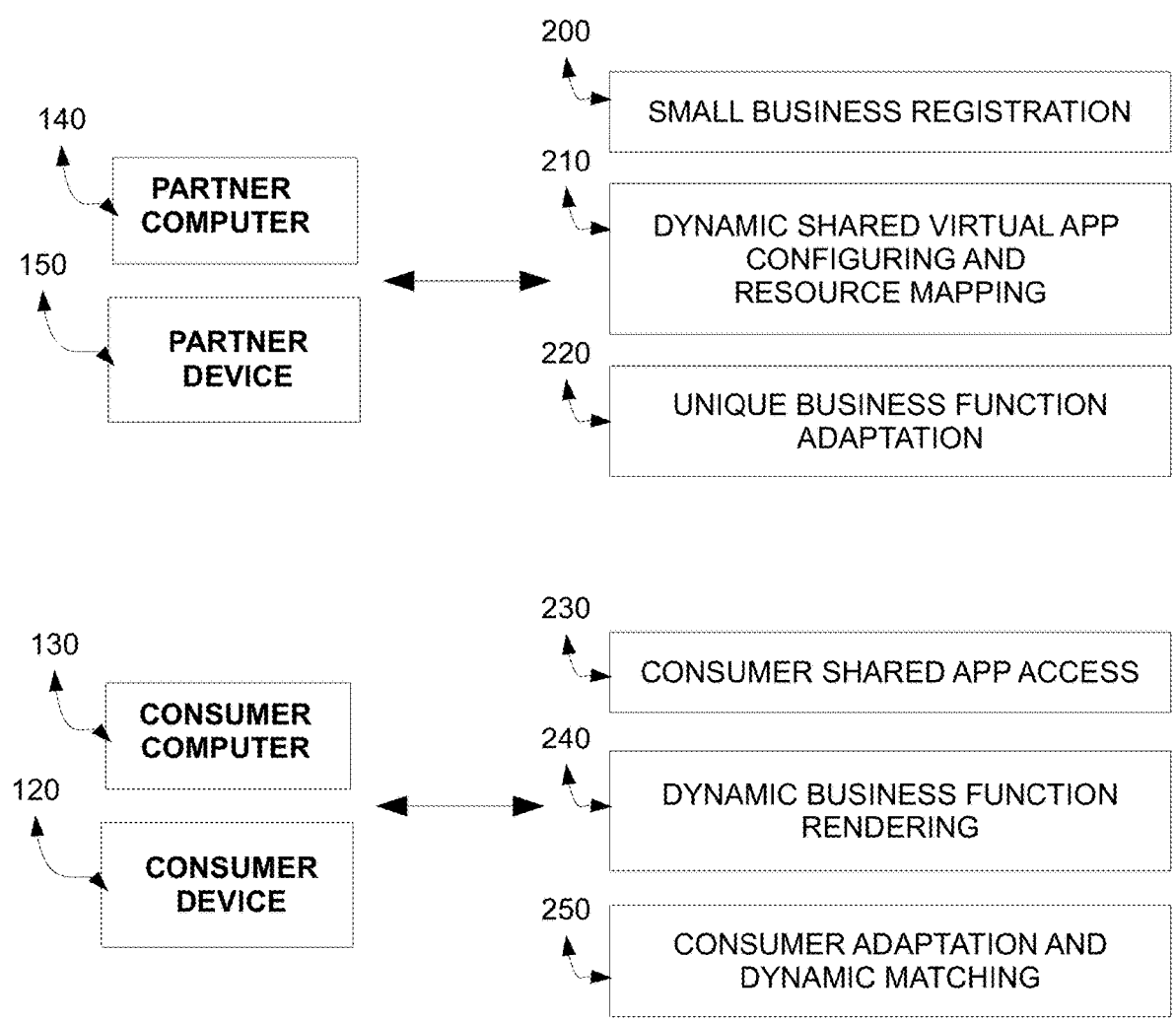

FIG. 3A

REGISTRATION SCREEN EXAMPLE

310

PARTNER MOBILE APP

| | | | |
|---|---|---|---|
| LOGIN | XYZABC | PASSWORD | ********** |

| | |
|---|---|
| BUSINESS NAME | JOHN'S TAXI |
| BUSINESS TYPE | TRANSPORTATION |
| CREDENTIALS | DUNS-NUMBER-123456 |

FIG. 3B

SHARED VIRTUAL APP CONFIGURATION SCREEN EXAMPLE

320

PARTNER MOBILE APP

| | |
|---|---|
| VIRTUAL APP NAME | JOHN'S TAXI TO GO |
| SERVICE TYPE | TAXI SERVICE |
| DESCRIPTION | PROVIDE ON DEMAND TAXI SERVICE TO SAN FRANCISCO METRO AREA |

FIG. 3C     SHARED RESOURCE MAPPING SCREEN EXAMPLE
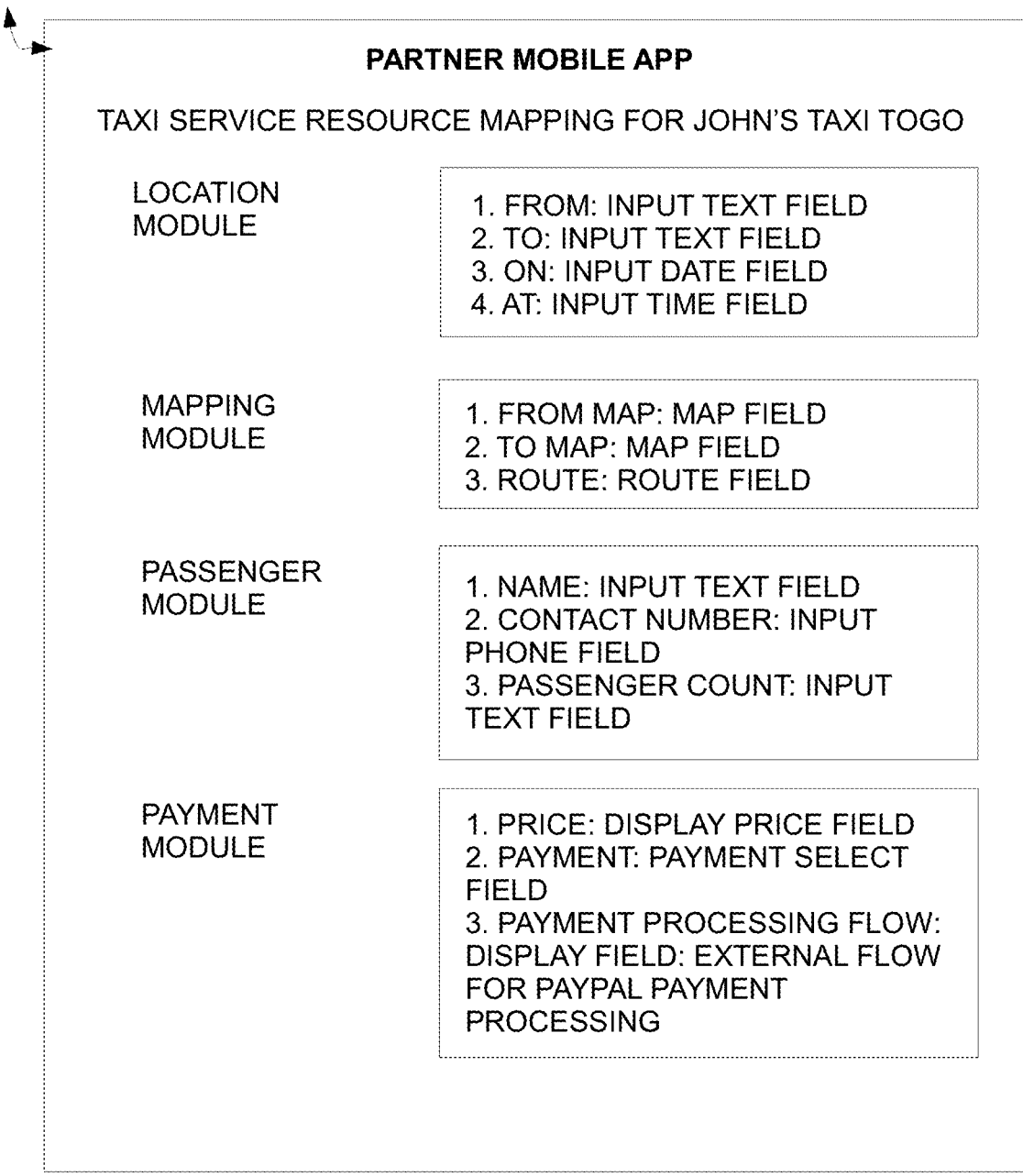

FIG. 4A
CONSUMER SHARED APP ACCESS SETUP SCREEN EXAMPLE

410

CONSUMER MOBILE APP

PHONE NUMBER   +1-650-123-4567

ZIP CODE   75962

FIG. 4B
CONSUMER SHARED APP ACCESS SCREEN EXAMPLE

420

CONSUMER MOBILE APPP

| SAN FRANCISCO RESIDENT INFO | JOHN'S TAXI TO GO |
|---|---|
| GOLDEN LIMO SERVICE | CITY YELLOW CABS |

PRESET SHARED VIRTUAL APP SCREEN EXAMPLE

ADATED SHARED VIRTUAL APP SCREEN
EXAMPLE

FIG. 4E

PUBLIC SHARED VIRTUAL APP SCREEN
EXAMPLE

450

CONSUMER MOBILE APP

SANF FRANSISCO RESIDENT INFO

EVENTS THIS WEEK:
1 GREEN MARKET ON MAIN STREET 9AM-5PM SAT JULY 4TH

2. FAIRGROUNDS OPENED AT CENTRAL STADIUM WEEK OF 3RD

3. FIREWORKS ON 4TH AT FISHERMAN'S WARF

PUBLIC WORKS:
1 ROADWORK ON 7TH ON WINDING WAY. EXPECT DELAYS.

2. WATER MAIN BROKE ON MAIN ST

3. ROAD CLOSED: MAIN ST, GREENWICH AVE NORTH

REPORT ANY ISSUE:

REPORT

DATA STORE EXAMPLE

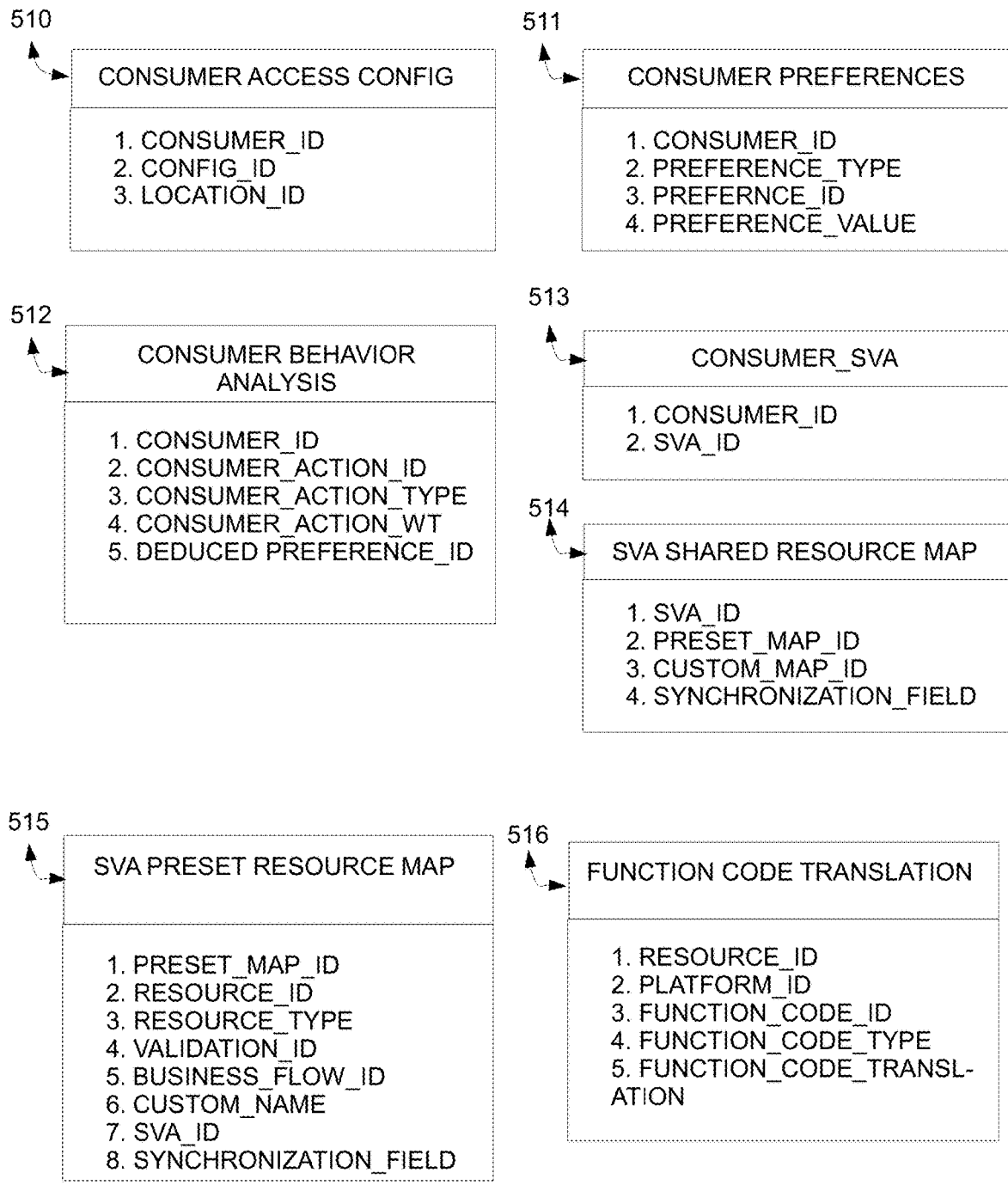

METHOD AND APPARATUS FOR SHARED MOBILE DEVICE APP WITH UNIQUE BUSINESS FUNCTION ADAPTATION AND RENDERING

CROSS-REFERENCE TO RELATED APPLICATIONS

This application is entitled to the benefit of Provisional Patent Application Ser. No. 62/373,706, filed 2016 Aug. 11.

BACKGROUND

Field of Invention

This invention relates to mobile device or Web apps.

Shortcomings of Current Solutions, and New Innovative Proposed Approach

There is a shift from Web to Mobile for online information and business transactions. Typically, a business will incur significant amount of investment to develop a mobile app that will run on various mobile device platforms such as iOS or Android. The consumer then will need to download such mobile app on their respective devices to access the information or conduct a business transaction with that business. The mobile platform enables consumers to access business information or conduct business transaction instantly from a mobile device at the point of need. This is a significant advantage for bigger businesses that have capital and resources to develop such mobile apps. It becomes even more expensive to maintain such apps as the mobile device platforms are evolving constantly and changes in the developed mobile apps are necessary to keep them working on the new evolved mobile device platforms and technologies. This creates a significant burden on a small business that is competing for the same consumer with a bigger business with resources to build such mobile apps. So even if the small business may offer better or comparable business service may suffer business loss due to lost access to the consumer.

Additionally, every time a mobile app is developed the consumer needs to download the mobile app on the respective device This requires time, effort for the consumer to search, download, and install the app as well physical storage space on consumer's mobile device that costs money for the consumer. Therefore, consumer is inclined to download only limited number of such mobile apps further constraining a small business if a bigger business has already taken such storage space on consumer's device. Furthermore, the consumer also suffers as the services of the small business that may be better are not accessible due to shortcomings of the existing technologies to be available easily for a small business as well as shortcomings of the existing technologies for the consumer in accessing large number mobile apps easily and economically. The present invention addresses these shortcomings and offers a completely new and innovative approach with significant benefits for the small business or any such entity as well for the consumer in saving time, effort, resources, and monetary investments. The present invention offers this solution to the small business by creating a shared app platform where small business may not need to develop and maintain a separate app creating a significant monetary and business benefit for the small business against current available solutions. Further, the present invention offers a significant benefit in terms of effort, time, convenience, and money to the consumer by creating a shared app platform by which consumer needs to download and install the platform only once to be able to access shared app services from any number of businesses or information providers, The present invention additionally provides a significant benefit for a small business that may need to offer a unique set of services and hence may need a unique mobile app to be able to adapt the shared app platform to the specific needs of the small business. Similarly, the present invention also provides a significant benefit to the consumer who may have unique needs different from other consumers by enabling the consumer to adapt the shared app platform to the personalized needs of the consumer.

So, as described below, the present invention provides a new and innovative way to resolve these issues and provides a method for a small business or any entity to utilize a shared mobile app platform with unique business function adaptation and rendering to retain competitive advantage and consumer personalization and save time, effort, and monetary investments for small business to develop an independent app and save time, effort, and device space for consumer to search, download, and install a new app for every small business.

SUMMARY AND UNIQUE ADVANTAGES

The objective of the present invention is to empower a small business to be able to provide mobile and advanced technology solutions to their customer without having to expend resources, time, and money to develop or maintain such technology while still maintaining a competitive edge by making these technology solutions unique and adapted to their unique business functions. The objective of the present invention is also to empower a consumer to be able to access unique mobile and advanced technology solutions, services, and products offered by many different small businesses instantaneously, easily, and efficiently, without having to install these technology solutions or apps in case of mobile devices for each one. In accordance with the present invention, shared mobile device app comprises a computing system as described in detail here and method and apparatus for provide a shared technology platform for a small business to configure a mobile device app with preset or custom portable shared resource maps that are translated into device specific .executable function code and rendered dynamically for any consumer to access the shared mobile device app on any device interchangeably and benefit from uniquely adapted services offered by multiple small businesses without having to download separate technology apps individually.

Unique Advantages

Accordingly some of the several objects and advantages of the present invention are:

a) a significant cost, resource, and time savings for small business to offer its uniquely differentiated services by conveniently configuring a shared mobile device app as described by the present invention with no technology investment and instead of spending effort and money to develop and maintain its own technology app, b) a significant ease of use, change, and maintenance for the small business with a easy and yet powerful point-and-click configuration way to manage its shared mobile device app as described by the present invention instead of working with complexity of managing its own app on multitudes of device technology platforms used by the consumers, c) a significantly reduced time to market by configuring the shared mobile device app as described by the present invention instead of spending lot of time in development, testing, and defect fixing cycle, d) a significant advantage for the small business to maintain its competitive advantage and distinguishing business services by having the shared mobile app adapted and rendered uniquely to its unique business services and distinguishing factors, e) a significant benefit of flexibility for the small business by enabling it to use preset or custom shared virtual apps based on its needs, f) a significant cost, resource, and time savings for the consumer by enabling the consumer to use uniquely adapted shared mobile apps from many small businesses without having to spend time and resources downloading, installing, and setting up individual apps for each one of them, g) a significant convenience to the consumer by having any shared mobile app available instantaneously as soon as configured by the small business rather that searching for it, selecting it, and then downloading and installing it, h) a significant benefit of ease of use, efficiency, and consistent quality for the consumer as the apps are only configured by the small business and consistent ease of use, efficiency, and quality is maintained across all the shared virtual apps by the computing system, i) a significant benefit for the consumer to have the access to relevant information, services, and products offered by many different small businesses dynamically, with added benefit of self learning method used to enhance relevance, without necessarily the consumer having to search and select different such individual independent apps on own even though the consumer may still be able to choose to do that for shared mobile apps, j) a significant flexibility of access configuration for both small business and the consumer to the shared mobile apps such as private access, public access, access by consumer selection, or access based on configurations by small business, or access based on configurations by consumer, or a combination, k) a significant benefit of portability of the shared virtual app, the configurations, and the data across many platforms for both consumer and the small business because the shared mobile apps are configured and then rendered dynamically on different technology platforms.

Diagrams, Component Description of Preferred Embodiment, and Operation

To facilitate a complete understanding of the invention, the description of the preferred embodiment is arranged within the following sections:

Glossary of Terms and Acronyms

The following terms and acronyms are used throughout the description:

Client-Server: A model of interaction in a distributed system in which one program sends a data-processing request to another independent program. The requesting program is called the "client", and the program that responds to the request is called the "server".

Internet: A collection of interconnected (public or private) networks that are linked together by a set of standard protocols. Internet allows two computers on two disparate networks to connect and send requests to each other.

World Wide Web ("Web"): A distributed collection of inter-linked, user-viewable hypertext documents (commonly referred as Web documents or Web pages) that are accessible via the Internet. It is also used herein to refer to the client and server software components, which provide user-access to such documents using standardized Internet protocols.

Web Site: A computer system that serves informational content over a network using the standard protocols of World Wide Web. Typically, a Web site corresponds to a particular Internet domain name, such as "google.com". As used herein, the term is generally intended to encompass the hardware/software server components that server the informational content over the network Web Server: Web server is a software component of a Web site that accepts HTTP requests and serves informational content with the help of static HTML documents or other software components helping to create dynamic HTML documents or combination of both.

Web Browser: Web browser is a software component at the client side that accesses the informational content from Web server. Broadly, Web browser accesses informational content and renders it on the client screen.

HTTP (Hyper Text Transport Protocol): The standard World Wide Web client-server protocol used for the exchange of information. HTTP includes a number of different types of messages that can be sent from the client to the server to request different types of server actions. HTTP GET request sends a message to server to access a document. HTTP POST request sends a message to server to process data and includes data in the message.

HTML (Hyper Text Markup Language): A standard coding convention and fixed set of codes for attaching presentation and linking attributes to informational content within documents.

Application Server: Computer application that accepts requests from the user, accumulates data from various server side applications, formats it suitable for the user interface, and sends the data back to end-user. In web application scenario, application server works in conjunction with web server and accepts request, and provides the formatted data to web server.

JAVA: a widely used object-oriented computer programming language and computing platform used for Web or mobile device programming JavaScript: an object-oriented computer programming language commonly used to create interactive effects within web browsers JSON: an acronym for JavaScript Object Notation, a lightweight data-interchange format. It is easy for humans to read and write. It is easy for machines to parse and generate. It is based on a subset of the JavaScript Programming Language iOS: an operating system used for mobile devices manufactured by Apple Inc Android: an operating system platform for mobile phones developed by Google and the Open Handset Alliance (OHA), a coalition of hardware, software and telecommunications companies Relational Database: a database management system (DBMS) that is based on the relational model as introduced by E. F. Codd that organizes data in several relevant data sets or data tables each unique record in the data set identified by a unique key and maintains relationship between unique data sets using such unique keys called relation keys SQL: an acronym for Structured Query Language that is used to communicate with a database. According to ANSI (American National Standards Institute), it is the standard language for relational database management systems API: An application program interface (API) is a widely used code that allows two software programs to communicate with each other. The API defines the correct way for a developer to write a computer program that requests services from an operating system (OS) or other application provided by a third party Paypal: a company and product providing online and mobile payment service Stripe: a company and product providing online and mobile payment service

DIAGRAM AND COMPONENT DESCRIPTION

There are many different ways to implement method proposed by present invention and the following description is one of such ways. This embodiment of the present invention uses a computer system whose functions are accessible over the Internet as a Web site or in another case as an app deployed on a mobile device. The Web site or the app deployed on the mobile device provide a user interface as well perform various complementary functions used in the present invention. Part of the computer system or whole may be deployed as an additional functionality on the app on the mobile device itself offering similar functions as would be by the computer system accessible over the Internet. The computer system uses a computer data storage mechanism such as database to retain and various computer operations to store, retrieve, and process such information in order to complete required functional operation. The small businesses and consumers may use provided app on mobile device platforms or Web site to access and perform operations on the computer system.

FIG. 1 shows one of the embodiments to use the present invention and displays major parts of the embodiment for the computing system that is a non-transitory computer-readable medium. Shared mobile device app (SMDA) server, 100, shows computer program, 104, that implements various operations as described in detail for each operational step below. Computer program, 104, may use a data store, 105, to record received and processed data to assist several operations. Server connection interface program offers a mechanism for other components of the computer system such as consumer device, 120, or partner device, 150, or consumer computer 130, or partner computer, 140, to connect with the server computer program, 104, to utilize various computer program operations and data processing, As described earlier, in another embodiment, such computer program, in part or whole, may also be deployed on the mobile device itself for consumer or partner to support mobile device computer program, 124, for consumer or mobile device computer, 154. Consumer device mobile app that is part of the overall computing system deployed on consumer device, 120, may contain components such as consumer app user interface, 122, consumer app computer program 124, consumer app data store, 126. The user interface, 122, with the computer program, 124, and the data store, 126, may be together compiled and installed on a consumer mobile device, 120, as a consumer mobile app, 127. Consumer mobile app may use mobile device platform to access any operations on the server, 100, by utilizing platform connection interface 128 and a wide area network, 180. Consumer may also use a Web based computer device, 130, supporting Web browser, 132, to connect with the server, 100, and utilize various server operations. Similarly, a small business termed interchangeably as a partner, may use a device mobile app that is part of the overall computing system deployed on partner device, 150, may contain components such a partner app user interface, 152, partner app computer program 154, partner app data store, 156. The user interface, 152, with the computer program, 154, and the data store, 156, may be together compiled and installed on a consumer mobile device, 150, as a partner mobile app, 157. Partner mobile app may use mobile device platform to access any operations on the server, 100, by utilizing platform connection interface, 158, and a wide area network, 180. Small business or partner may also use a Web based computer device, 140, supporting Web browser, 142, to connect with the server, 100, and utilize various server operations.

As described here the computing system is a non-transitory computer readable medium that may comprise of multiple distributed computing components in various combinations of one or more of the described components such as SMDA servers, 100, partner computer, 140, partner mobile app, 157, consumer computer, 130, and consumer mobile app, 127. The computing system may provide a dynamic shared app configuring operation to a small business partner to create and configure a shared app resource referred hereafter as the "Shared Virtual App". Different Shared Virtual Apps may be configured by different small business operators just using easy-to-use, point-and-click or sophisticated configurations within a same mobile app implementing the method of the present invention and without having to spend effort and resources to create and maintain different apps on different computing devices. These Shared Virtual Apps with their own unique adaptations and rendering then may be used by many different consumers within the same mobile app implementing the method of the present invention and without having to download different apps for each small business as is being done currently.

FIG. 2 depicts a high level operations flow for one of embodiments to use the present invention. The flow depicts that a small business partner may use partner computer, 140, or a partner mobile device, 150, to utilize operations or functions provided by the computing system implementing the presenting functions. The partner may utilize a small business registration function, 200, to register as an entity configuring the Shared Virtual App and providing information or services to consumers through a Shared Virtual App without having to develop and maintain apps on different devices. The partner may utilize a dynamic Shared Virtual App configuring and resource mapping function, 210, for computing system to identify shared resources allocated for the Shared Virtual App. The partner may further utilize a unique business function adaptation function to create custom configurations and resource maps to adapt the Shared Virtual App to the unique business services and functions that the small business provides maintaining its competitive edge and uniqueness of each Shared Virtual App.

FIGS. 3A-3D depict a sample User Interface for a small business partner to create and configure a Shared Virtual App with some of the relevant User Interface (UI) components to describe implementation and use of one of embodiments for the present invention.

FIG. 3A shows a sample of some of the relevant UI fields for a registration screen, 310, provided by the computing system for a small business partner to register as a provider for the Shared Virtual App and any business services associated with it. Using the registration screen, 310, the partner may set login credentials, and input business information and credentials with the computing system for recording the data store. This may include additional fields that may be further relevant for registration process.

FIG. 3B shows a sample of some of the relevant UI fields for a Shared Virtual App configuration screen, 320, provided by the computing system for a small business partner to configure the Shared Virtual App that may be used by a consumer to access information, services, and products provided by the small business partner. Using the Shared Virtual App Screen, 320, the partner may provide configuration choices to the computing system such as name, select configuration fields such as a business type so as to have any preset data associated with such fields be available and associated with the Shared Virtual App. The Share Virtual App Screen, 320, may also include additional fields that may have additional preset shared resource mappings associated with them for configuration as described in the operation below.

FIG. 3C shows a sample of some of the relevant UI fields for a shared resource mapping screen, 330, provided by the computing system for a small business partner that it may use to review and verify the Shared Virtual App UI, any validations, and functional/transactional flow. These UI fields and associated business flows may be unique to the configuration choices made by the small business and may be prerecorded and selected dynamically by the system using standard database queries for a combination of configuration choices. For example, in the shared resource mapping screen, 330, partner is using taxi service configuration which may have preset modules such as location module, mapping module etc with prerecorded association with the UI fields such as From or To, with UI specifications and validations such as Text field specification and validation with the flow indicated by their position top-to-bottom. The shared resource mapping screen, 330, also may association with any additional internal or external transaction flows similar to how the association is depicted for UI fields, such as Text validation or Date validation internal routine for internal flows and Paypal™ payment processing flow integrating external third party payment flow that is executed dynamically upon selection.

Figure 3D:
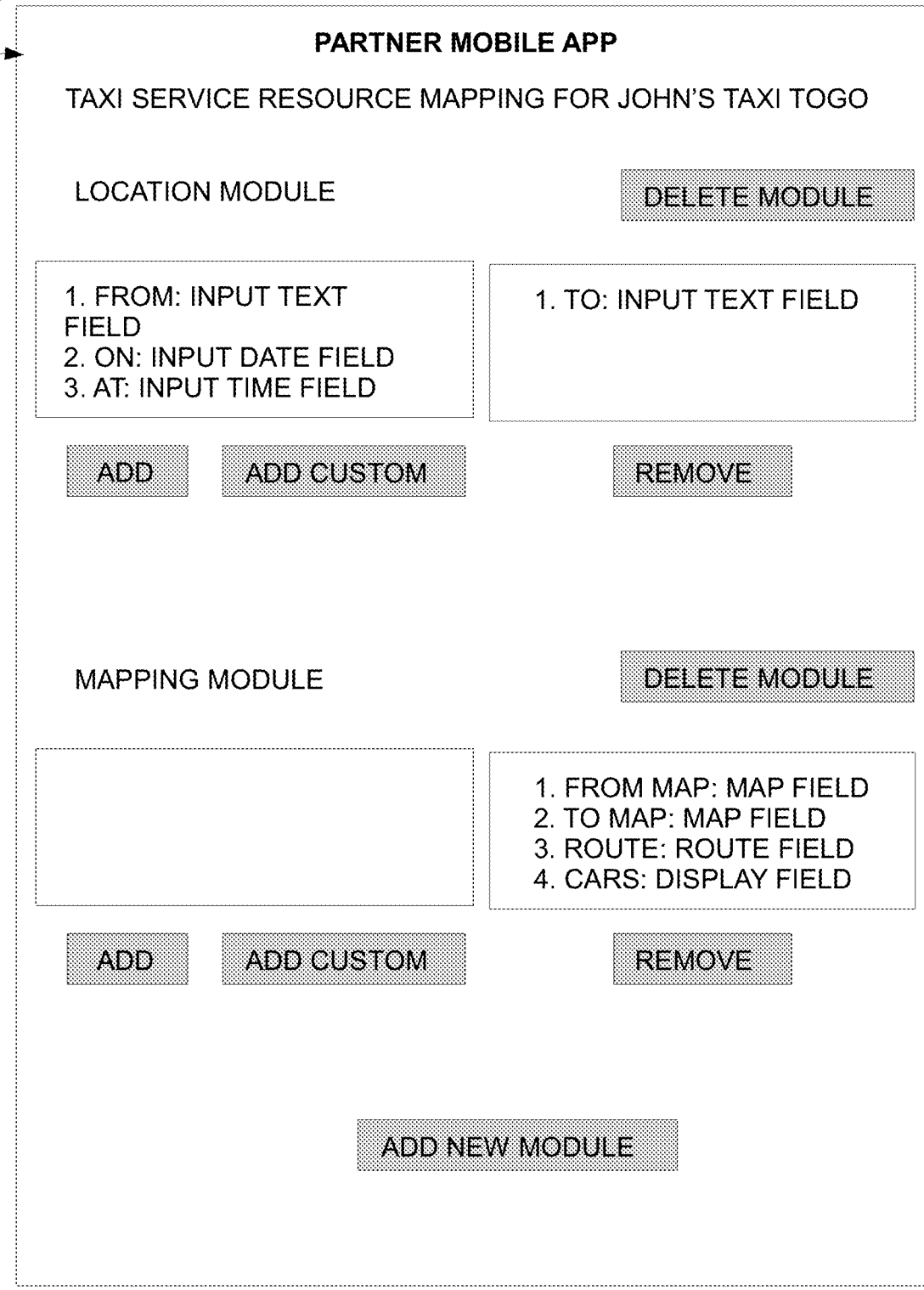

FIG. 3D shows a sample of some of the relevant UI fields for a unique business function adaptation screen, 340, provided by the computing system for a small business partner to configure the Shared Virtual App to partner's unique business function. The unique business function adaptation screen, 340, may request the data store for prerecorded data associations and available data associations, and display those for each module associated with the configuration, such as Location module. The unique business function adaptation screen, 340, may then provide standard list selection UI fields with data associations for available shared resource like From: Input Text Field or selected shared resources like To: Input Text Field. The unique business function adaptation screen, 340, may provide buttons such as add, remove for the partner to adapt the shared resource mappings to the specific business flow, for example in this case only adding To field and removing all the others. In the same fashion, the partner may add or remove any shared resource such as UI fields, validation routines, UI display characteristics, or any internal or external transactional flows. Additionally, the unique business function adaptation screen, 340, may provide button to add custom shared resources one of the example being a new external payment processing flow for Stripe™ in addition to Paypal™.

FIGS. 4A-4E depict a sample User Interface for a consumer or a customer of the small business partner to access and utilize Shared Virtual App with some of the relevant User Interface components to describe implementation and use of one of embodiments for the present invention.

FIGS. 4A and 4B shows a sample of some of the relevant UI fields for a consumer shared app access setup screen, 410, and consumer shared app access screen, 420, provided by the computing system for a small business partner to access the Shared Virtual App. A consumer may first download the app, in this particular example the consumer mobile app, 127. that implements methods of the present invention to provide Shared Virtual Apps to the consumer. FIG. 4A depicts some of the fields for access setup and registering a device with the consumer mobile app. The consumer shared app access setup screen, 410, may provide the consumer to setup a unique account identifier such as fully qualified mobile phone number with country code and any preference fields such as location or zip-code field that the system may use to adapt the computer access to the consumer preference.

FIG. 4B shows a sample of some of the relevant UI fields for the consumer mobile app to display relevant Shared Virtual Apps that the consumer can use to access information, services, and products from registered or participating small businesses. The consumer shared app access screen, 420, may display the Shared Virtual Apps available for the consumer to access based on any preference fields that the consumer may have used such as zip code, or based on any private access setup by a small business for the specific consumer, or any selection choice for a Shared Virtual App that the consumer may have made by standard search and select UI screen where search criteria may include various configuration fields for the Shared Virtual App and select action that the consumer may choose to select particular Shared Virtual App, or any Shared Virtual Apps chosen by the computing system for the consumer based on consumer preferences systems analysis of consumer behavior. For example, in this case, The consumer shared app access screen, 420, may display Shared Virtual App, "San Fransisco Resident Info" based on zip code preference from the consumer, "John's Taxi To Go" may be based on configuration field service type chose by the consumer as "Taxi Service", "City Yellow Cab" may be searched and selected by the consumer from list of all taxi services in the area, and "Golden Limo Service" may be chosen by the system for the consumer based on analysis of several fields such as zip code for Golden State, Limo Service because the consumer has used a higher end Taxi Service, and Golden Limo Service because it has top ratings and the consumer has shown behavioral preference towards top rated Shared Virtual Apps.

Figure 4C:
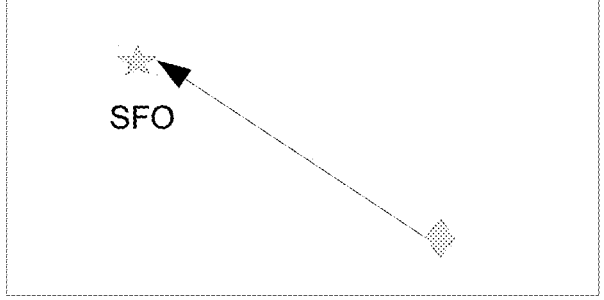

FIG. 4C shows a sample of some of the relevant UI fields for a Preset Shared Virtual App screen, 430, provided by the computing system with preset shared resource mappings rendered for the small business. The Preset Shared Virtual App screen, 430, depicts an example of rendering of a preset Shared Virtual App Screen without any unique business adaptations. Here, The Preset Shared Virtual App screen, 430, may be rendered upon selection by the consumer of the Shared Virtual App for "Golden Limo Service" where the computer program, 124, may request configuration choices associated with the Shared Virtual App and shared resource mappings, which are in this case are just preset shared resource mappings. The computer program, 124, upon receipt of these configuration choices and shared resource mappings, retrieve the associated function code routine required for rendering particular shared resource map from local data store, 126, or central database 106, or hard coded in the program itself or a combination of all these and then execute those to render the Preset Shared Virtual App screen, 430. So here, standard shared resource map for a taxi service is depicted as standard fields such as To, From etc that are rendered as Start, Destination etc as per the function code mappings, with any associated data validation routines and internal or external transactional flows for example here shown as a date validation routine or a map plotting routine or an external payment processing routine calling standard third party API services such as Paypal™.

Figure 4D:
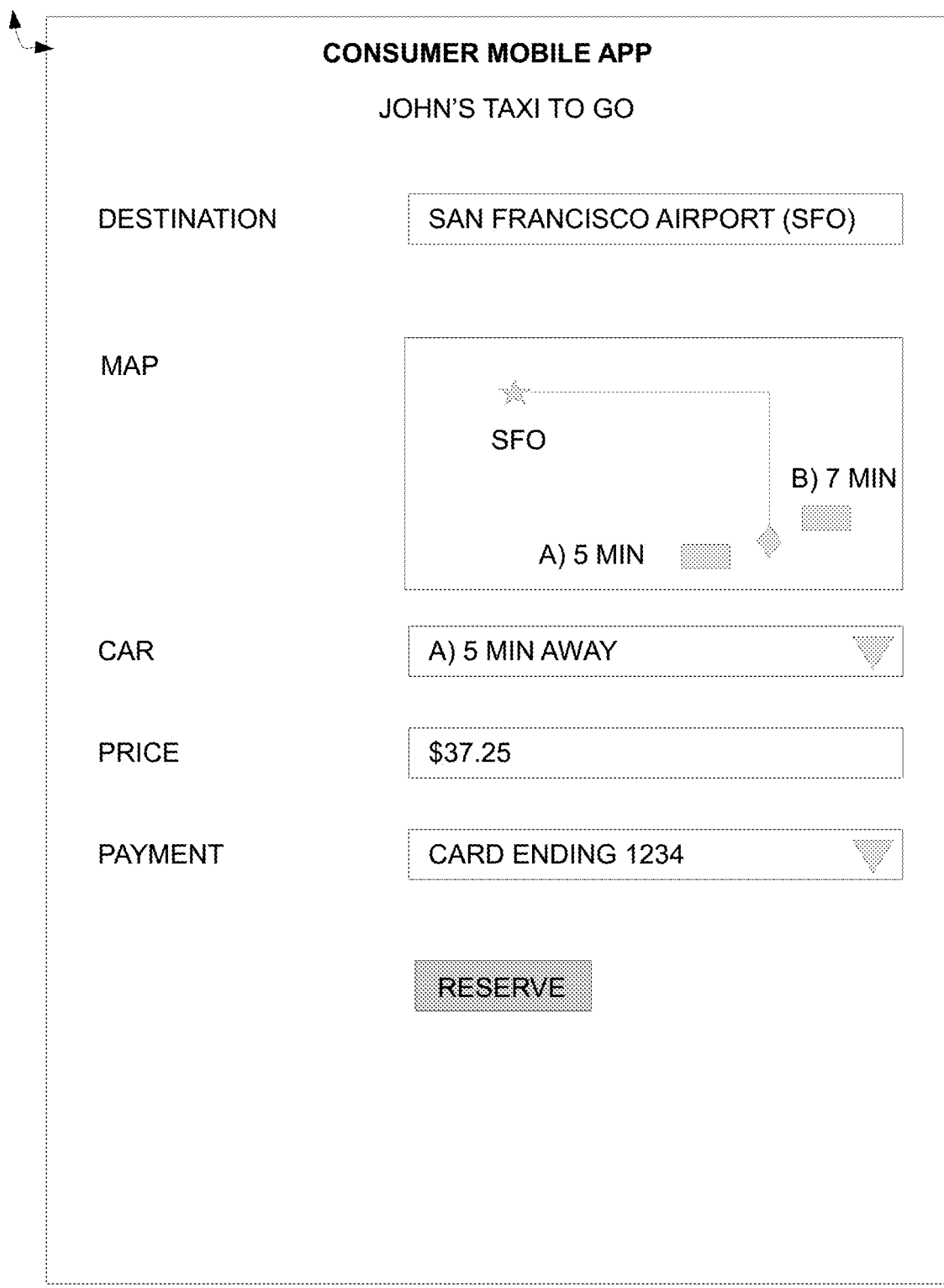

FIG. 4D shows a sample of some of the relevant UI fields for an Adapted Shared Virtual App screen, 440, provided by the computing system with customized shared resource mapping and unique business adaptations rendered for the small business providing the Shared Virtual App. Here, the computer program, 124, upon selection of Shared Virtual App "John's Taxi To Go" retrieves shared resource map that is custom built by the small business provider to be uniquely adapting to its business function of providing on demand taxi service where it uses current location as Start and only requires Destination field, and displays selection of available Cars based upon their distance. So in this case, the computer program, 124, upon retrieval of the shared resource map, renders the Adapted Shared Virtual App screen, 440, executing the mapping function codes for UI fields, validation routines, internal or external transaction flows, which in this case may be displaying available distances of car from current location, and external payment processing function as explained earlier.

FIG. 4E shows another sample of some of the relevant UI fields for a Public Shared Virtual App screen, 450, to point out the differences between public and private configuration type for a Shared Virtual App and its rendering for the consumer. Here the computer program, 124, selects based on the zip code preference by the consumer, the Shared Virtual App for the city of San Francisco residents that has been configured to be available to all consumers that choose the zip code preference. The computer program, 124, then renders the app in a method similar to a preset or adapted Shared Virtual App. Similarly, a Shared Virtual App may be configured by the small business for a private or selected group of consumers and the consumer association is added specifically by the small business using standard search and select function and the computer program, 124, then displays such private Shared Virtual App based on association setup by the small business with rendering done in a similar method to a preset or adapted Shared Virtual App.

Figure 5A:
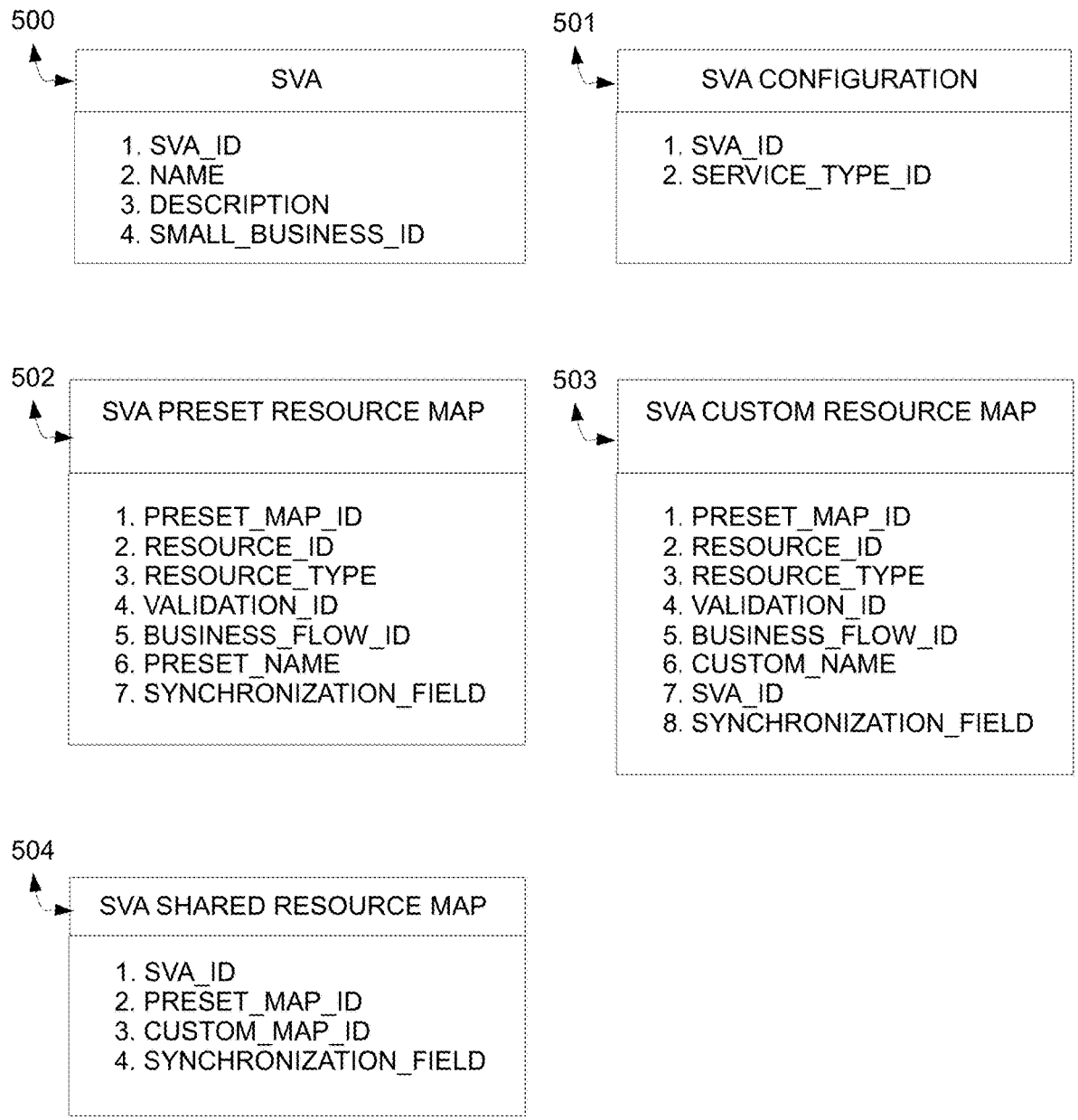

FIGS. 5A and 5B depict a sample data store structure to assist with the description of implementation and use of one of embodiments for the present invention.

FIG. 5A shows a sample of data store structure and in this particular example using a standard relational database some of the relevant relational tables for configuration, shared resource mapping, and unique business adaptation functions of a Shared Virtual App. For example, FIG. 5A, shows depiction of sample table SVA, 500, for storing information data fields associated with Shared Virtual App; SVA Configuration, 501, for storing configuration choice information data fields for the Shared Virtual App; SVA Preset Resource Map, 502, for storing data fields for preset shared resources maps; SVA Custom Resource Map, 503, for storing data fields associated shared resource mapping of adapted Shared Virtual App, SVA Shared Resource Map, 504, for storing shared resource map data fields associated with Shared Virtual App. Here, the computer program, 104, may access database, 106, to create these data tables and fields centrally for storing and retrieving data; similarly computer program, 154, and local data, 156, may create and synchronize these table and fields on the partner device, 150. The data table SVA, 500, may store identifier fields SVA_ID to uniquely identify Shared Virtual App with standard identifier creation operations like auto increment and store associated information in the table as depicted in the diagram. The data table SVA Configuration, 501, may similarly store data and relationship fields for configuration such as shown here a relation key SERVICE_TYPE_ID for identify service provided by the Shared Virtual App. The data table SVA Shared Resource Map, 504, may store shared resource mapping relation keys such as PRESET_MAP_ID and CUSTOM_MAP_ID for preset and custom shared resource map data tables respectively. In turn, data tables for SVA Preset Resource Map, 502, and SVA Custom Resource Map, 503, may store detail data fields and relationship keys for shared resources such as UI fields as relation key RESOURCE_ID, or validation routines as relation key VALIDATION_ID, or third party or internal transaction flows fields as relation key BUSINESS_FLOW_ID etc and in case of custom map an identifying name data field as CUSTOM_NAME. The tables may use a synchronization field such as SYNCHRONIZATION_FIELD with value like last updated timestamp to discover if there is a data synchronization gap between local data, 156, and central database 106.

FIG. 5B shows a sample of data store structure and in this particular example using a standard relational database some of the relevant relational tables for consumer access and preferences configuration, consumer behavioral analysis and dynamic learning, function code translations, dynamic unique business adaptation rendering functions for a Shared Virtual App access. For example, FIG. 5B, shows depiction of sample table Consumer Access Config, 510, for storing consumer access configuration fields; Consumer Preferences, 511, for storing consumer preference data fields; Consumer Behavioral Analysis, 512, for storing data fields for consumer behavior data points recorded and analyzed by the computing system; Consumer SVA, 513, for storing data fields recording relationship or access for Shared Virtual App by the consumer; SVA Shared Resource Map, 514, for storing shared resource map data fields associated with Shared Virtual App; SVA Preset Resource Map, 515, for storing preset shared resource map data fields associated with Shared Virtual App; Function Code Translation, 516, for storing data fields associated with function code translation relevant for the specific device platform and executed by the computer program 124. Also, the computer program, 104, may access database, 106, to create these data tables and fields centrally for storing and retrieving data; similarly computer program, 124, and local data, 126, may create and synchronize these table and fields on the partner device, 120. The data table Consumer Access Config, 510, may store configuration data or relation keyfields such as CONFIG_ID or LOCATION_ID to identify relation keys for configuration field or a location preference field with values like zip code respectively. Similarly, the data table Consumer Preferences, 511, may similarly store data and relationship fields for preferences. The data table Consumer Behavioral Analysis, 512, may store data fields associated with consumer actions while interacting with Shared Virtual App or the consumer device app with identification and type fields like CONSUMER_ACTION_ID, CONSUMER_ACTION_TYPE respectively along with analytical fields like associated inference weight CONSUMER_ACTION_WT, and deduced preference relation key like DEDUCED_PREFERENCE_ID. The computing system may use these fields to store and update data dynamically as the consumer is interacting with the consumer device app and the computer program, 124, in turn updating access and/or rendering dynamically based on the DEDUCED_PREFERENCE_ID. The data table SVA Shared Resource Map, 514, and SVA Preset Resource Map, 515 may be synchronized data tables for locally storing information for quick retrieval upon receipt of data and synchronization field from the central database, 106. As explained earlier, the tables may use a synchronization field such as SYNCHRONIZATION_FIELD with value like last updated timestamp to discover if there is a data synchronization gap between local data, 126, and central database 106. The data table Function Code Translation, 516, may similarly store data and relationship fields for function code translations that are associated with retrieved shared resource map from table SVA Shared Resource Map, 514. The data fields for function codes such as FUNCTION_CODE_ID and FUNCTION_CODE_TYPE are platform specific and associated with a relation key PLATFORM_ID based on various available platforms with executable code translations specific to those platforms stored in data field FUNCTION_CODE_TRANSLATION. Computer program, 124, upon retrieval of shared resource map and platform specific function code translations associated with those shared resource maps may execute the executable code translations to render the Shared Virtual App.

The combined computing system performs operation of the present invention with various functions for the small businesses and consumers to create shared app platform as described with an overview for a broad understanding and a detailed implementation and operations description in two sections as follows.

Operations Flow Overview

FIG. 2 depicts a high level operations flow for one of embodiments to use the present invention. To get a broad understanding of such implementation, a high level operations flow may be a small business partner registering on the computing system, which is a non-transitory computer-readable medium, as a participant and provider of a Shared Virtual App. Then the small business participant to provide configuration and unique business function adaptation choices to the computing system with any unique business function that the small business requires. The computing system receives this configuration information and maps it into a combination shared resources such UI screen fields, validation routines, business module flows, and any transactional flows, internal provided by the computing system or external provided by a third party, for dynamic creation of a Shared Virtual App. The computing system provides then a technology platform or in this case a Web or a mobile device app that has access o the configuration and shared resource mapping information and executes prerecorded or dynamically selected specific device function code, for example iOS code constructs for an Apple device or android code constructs for an Android device, or a combination of HTML, Javascript, and cascading style sheets for a Web app, to dynamically render the Shared Virtual App for the small business. Further, the computing system provides access to the technology platform, the Web or Mobile app in this case, for any consumer to access and use the dynamically rendered unique Shared Virtual App for multiple small businesses without downloading and installing any more such platform or Web or Mobile apps.

In the embodiment shown, a small business may use partner computer, 140, or partner device, 150, to access the SMDA server, 100, to register as a participant and configure a Shared Virtual App. The configurations and mappings may be stored centrally in the database, 106, using the database access queries by the computer program, 104. The operations and functions of the computing system may be accessed by the small business using partner Web browser, 142, or device user interface, 152 and similarly by consumer using consumer Web browser, 132, or device user interface, 122. The operations may be carried out by the computing system in a distributed fashion with some data storage and operations performed centrally by the database, 106, and computer program, 104, respectively and some performed locally on the device by the consumer device database, 126 and partner device database, 156, and consumer computer program, 124 and partner computer program, 154 respectively. So a small business may register as a participant and configure Shared Virtual App using Web browser, 142, or device UI, 152, with distributed operation performed by device computer program, 154 or SMDA computer program, 104 accessed using network interface, 158. The configuration choices and shared resource maps for the Shared Virtual App may be stored on SMDA database, 106 and may be synchronized with device database, 156. The relevant computing system operations may be packaged as standard mobile device apps and deployed to publicly available standard app stores to be available for download. For example, the relevant operations accessed by a small business partner, as described earlier, may be coded and compiled on an iOS or an Android compiler platform as a partner mobile app, 157, and uploaded to Apple Store or Google Play to be downloaded on an Apple or an Android mobile device respectively. Similarly, relevant operations accessed by consumer may be compiled as a consumer mobile app, 127. Consumer may now download install on mobile device the consumer mobile app, 127, that implements the method as described by the present invention and the operations accessed by the consumer. The consumer may then access the user interface, 122, on the consumer mobile app, 127, to access multiple unique Shared Virtual Apps configured and supported by multiple small business to provide different information, services, or products. The consumer mobile app, 127 may display a selection of relevant Shared Virtual Apps to the consumer based upon his access choices, one example being a zip code where a selection of relevant Shared Virtual Apps for that zip code may be displayed to the consumer. Upon selection of a Shared Virtual App, the computing system may retrieve the relevant data for configuration choices and shared resource map for the Shared Virtual App from the SMDA server, 100. The computing system may further translate the shared resource map into a executable function codes relevant for the particular device where the consumer mobile app, 127, is being used such as iOS or Android. The computing system may then execute the function codes dynamically to render a unique Shared Virtual App specific to the small business services and operations that the consumer then utilize.

So effectively, any small business may use the computing system to configure and create unique Shared Virtual Apps relevant to its services and products without spending time, effort and resources to develop and maintain the technology; and any consumer may access multiple small business services and products without downloading and installing separate apps for each of them.

Detailed Operation Description

The present embodiment may use common implementation operations that are well know in the industry, for example, a relational database for database, 106; standard SQL constructs such as SELECT, INSERT, UPDATE, DELETE to query, add, update, or delete data records from the database; use of standard relational data tables and relational data keys with unique data identifiers like relational keys, or identifier for Shared Virtual App records created using routines such as auto increment; data relationship mappings across different data sets such as configuration choices and shared resource mappings, or shared resource mapping and function codes with relational data keys, execution of function code renderings with standard coding languages such as Objective C or Swift code constructs for Apple device app, or Java and Android library constructs for Android device app, or HTML, Javascript, Cascading Style Sheets for Web browser app; Java, JSON language constructs for computer program logic; HTTP or HTTPS protocol for Internet data transfer. These are just well known examples for implementing the operations that are described below and any person familiar with these well known practices will be able to implement the operations using these practices. Operations for the preferred embodiment are describe in detail as follows.

Small Business Registration

A small business, also referred as the small business partner or the partner, may utilize a registration operation on the computer system to register as a service provider, providing a shared app function that may comprise service, product, or informational content delivery to customers of the small business. The small business partner may use a Web site provided as part of the computer system or in another case may use an app supported on a mobile device platform, where the app is provided as the part of the computer system. For example a uniform resource locator (URL) for Web site like http://www.example.com/partner or partner mobile app for iOS or Android from Apple App Store or Google Play. The registration function may perform steps of a) requesting, b) verifying, and c) storing information related to the small business in the data store, information that may contain login credentials, business credentials, business type information, service and product information etc.

a) Requesting and b) Verifying:

The computer system may use mandatory or optional User Interface (UI) screen fields on a computer or a mobile device platform to request certain set of information and verify them by checking against stored data validation requirements. Such operation may be implemented using standard HTML for Web UI screen fields or standard iOS or android language constructs for mobile device UI screen fields. One example of validation requirements may be validation for business credentials in different countries. The validation may be done using stored data and data type requirement or in another case using a third party service.

For example, in preferred embodiment, Shared Mobile Device App (SMDA) Server may use computer program 104, to send required or optional user interface fields utilizing standard HTML language for partner computer Web browser, 142 or any standard data field transfer language such as JSON for partner mobile device computer program, 154, to display the fields using user interface, 152, and receive required data from a partner, a small business intending to partner with entity providing shared mobile device app service. The computer program, 154, may use various standard mobile device languages such as iOS for an apple mobile device for partner device, 150, or for consumer mobile device, 120. Validation of received information may be done using required validation information passed by computer program, 104, retrieving and interpreting data from database, 106, to Web browser, 142, that in turn renders such information using standard language protocols such as HTML or JavaScript. For mobile device such validation may be done by computer program, 154, receiving information from user interface, 152, and validating against instructions in computer program, 154, and data stored in local data, 156. Computer program, 154, may utilize network, 180, to send request using standard protocols such as HTTP to any third party service providers using their application programming interface or API for validation or any such outsourced business services. These are common and well known implementation methods as described earlier and may be used for this operation as well as the other operations that are described below.

c) Storing:

The computing system may store information for various operations described such as registration, configuration, preferences, resource associations or mappings, or executable function code mappings in its data store to query, search, validate, and update again as needed by the computing system. The computing system may request, verify, and store information from small business such as login credentials and business identification information. Such operation may be implemented with readily available standard databases such as MySQL on server computing system and utilizing standard data access languages such as JAVA to run database queries for accessing, inserting, updating, or deleting a data record using one of the standard database access languages such as SQL. In the implementation of preferred embodiment all data storage access procedures such as data retrievals, data insertions, data verifications, or data updates may be performed on such standard databases using standard data access languages. Such databases may be stored on a remote common server as part of the computing system or on mobile device itself. Also in case of distributed data storage system where common data storage may be used on a remote common server as part of the computing system and device database such as CoreData for iOS or SQLLight for Android is used for mobile devices, data access routines may be similarly used to access either of remote or mobile database and keep them synchronized as explained in various synchronization operations below. For example, in preferred embodiment, SMDA server computer program, 104, or partner computer program, 154, or consumer computer program, 124, may use server database, 106, or partner local database, 156, or consumer local database, 126, respectively to store data using relational data sets, relational keys, and SQL queries to store, update, or delete data. Registration screen, 310, depicts implementation for requesting the information related to login credentials and any business identification information such as name, business type, business credentials etc. The computing system may use record function as explained above to store this information in database.

Dynamic Shared App Configuring and Resource Mapping

The computing system may provide a dynamic shared app configuring operation to the registered small business partner to create and configure a shared mobile app referred hereafter as the "Shared Virtual App". The small business records the configuration of the Shared Virtual App with preset or customizable platform resources from the computing system with the operation as described below. The computing system may record the Shared Virtual App associating it with a unique identification number such as a database auto increment or such number that will uniquely identify Shared Virtual App and may be used as a relational key in identifying configurations, and shared resource associations or mappings associated with the Shared Virtual App. The dynamic shared app recording operation may contain steps of a) requesting, verifying, and recording configuration information for Shared Virtual App, and b) translating and recording shared resource mappings with the Shared Virtual App.

a) Requesting, Verifying, and Recording Configuration Information:

The computer system may use UI screen fields requesting from the small business partner certain set of Shared Virtual App configuration information, and analyzing and verifying them against stored validation requirements. Example of configuration information may be type of Shared Virtual App, type of business or transaction information required for the use of the Shared Virtual App, location of business or service, access rights and/or authorized users for the Shared Virtual App, shared app platform resources required for the use of the Shared Virtual App, and selection of combination UI fields and business and transaction flow for the Shared Virtual App. The computing system may use computer data store for recording the information and associates a unique identifier with each recorded Shared Virtual App.

Requesting, verifying, and recording of information may be implemented similar to as described earlier in the requesting, verifying, and recording of information in registration operation. Configuring of Shared Virtual App information may be implemented by allowing the small business partner to select from prerecorded choices of shared app business configuration information such as business type, location of service, transaction type etc. and recording the configuration information received from the small business as a Shared Virtual App configuration in the data store. The unique identifier recorded with Shared Virtual App may be implemented with any standard unique identifier generation algorithm such as auto generation identifier function in a standard database.

For example, in the preferred embodiment, the Shared Virtual App configuration screen, 320, depicts the UI fields that may be used in configuration choices for the Shared Virtual App, such as name, service type, description. There may be further additional fields such as location, and various characteristics etc. The partner computer program, 154, then request, verify and store the configuration using the API provided by SMDA server computer program, 104, in the server database, 106. The server database, 106, may use an auto increment function to create a unique relational key identifier to be associated with the data record for the Shared Virtual App. The partner device database, 156, may synchronize information with server database, 106, as described before. The example of the data tables is depicted in FIG. 5A, with table SVA, 500, that has unique identifier key SVA_ID.

This operations offers a significant cost savings benefit to the small business by enabling it to create a Shared Virtual App and provide information, services, or products to its customers easily without investing time, effort, resources in creation & maintenance of technology User or User Type Configuration:

The small business may use this function to configure access for the Shared Virtual App by user types, or users or consumers directly using any of their identifiers. This may be implemented by recording in the data store a selection of prerecorded user types or new user types pertaining to business type for the Shared Virtual App and associating them for example using standard database relational keys. Similarly, individual users or consumers also may be searched using standard data query function for one or more data field associated with the user and associated with the Shared Virtual App record using a relational identifier key mapped in the relational table.

This function offers a significant benefit to the small business by making the Shared Virtual App flexible to use across different sets of user base and control access of different user types to different functionalities creating a powerful utility. This also offers a significant benefit to the small business if it wants to keep the usage of the Shared Virtual App private or restricting the access to a select group of consumers using this function and configuring those selected consumers to be associated with the Shared Virtual App.

Usage Rights Configuration:

Shared Virtual App may create exclusive rights of use of shared app platform resources pertaining to that Shared Virtual App to small business creating the Shared Virtual App. The small business may choose to permit use of some or all Shared Virtual App resources to other authorized entities. This may be implemented by recording an association of usage rights for configured Shared Virtual App with other authorized entities. This function offers a benefit to the small business by enabling the small business to configure an app functionality easily for use by partners and associates that may add to operational efficiency as well as drive potential new income and revenue for the business.

This function offers a benefit to the small business by enabling control of the Virtual Shared App availability dynamically based on various parameters such as zip code and also add security and control by only verified authorized partners. This function along with user type configuration can have a benefit of being able to create public shared app where availability control may be controlled based on parameters like zip code or private shared app where users and user types may be configured by the small business.

b) Translating Configuration and Recording Shared Resource Mapping:

The computing system may use translating configuration choices and recording shared resource mapping function to associate with Shared Virtual App a shared resource mapping. Example of shared resource mapping is a combination UI fields, validation logic, and business and transaction flow or logic for the Shared Virtual App. The shared resource mapping may be used by the computing system to build and render the Shared Virtual App dynamically Computing system may utilize preset shared resource mapping against various configuration choices to facilitate quick creation and deployment of such Shared Virtual App. This function may be implemented by prerecording in the data store a selection of UI fields, data fields, and business and transaction logic against combination of a business type at a geographical location for a set of users and may be further associated with other such configuration information fields. The computer system may then present a choice of preset configurations during or after the creation Shared Virtual App, record the choices by the small business from the preset menu options, and allocate those resources for use of the Shared Virtual App.

For example, in the preferred embodiment, the shared resource mapping screen, 330, depicts various shared resources that may be used for rendering a Shared Virtual App and its services. The shared resources such as, for a "Taxi Service" Shared Virtual App, a combination of UI and data fields "From", "To" etc that have validation logic for text field, and UI and fields such as "On", "At" that have validation logic for date and time validations, and all these group in a logical grouping or module of "Location Module", and further and external business process or transaction flow field for "Payment Processing Flow" with logic associated to call service APIs from third party providers such as "Paypal Payment Processing". The partner computer program, 152, using API requests from server computer program, 104, may store these associations or mappings as relational data sets using relational data keys as explained earlier in server database, 106, synchronized with partner local data, 156. The example of the data tables is depicted in FIG. 5A, with table SVA Configuration, 501, with one of the configuration field shown as SERVICE_TYPE_ID.

This function offers a benefit to the small business by simplifying even a complex business flow configuration by prerecording the most relevant business flow and resource mapping and enabling the small business to simply use it by point and click. It also enables the small business to review the resource mapping and choose to use the unique business adaptation function if it wants to alter the map to match its unique business function.

Unique Business Function Adaptation

The computing system may provide a unique business function adaptation operation on the computer system for the small business to adapt the share app to its distinct business functions. This enables the small business to utilize shared app platform, save resources, app development and maintenance costs, but still offer distinct business and app functions relevant to its business and retain competitive edge. The Shared Virtual App adaptation operation may contain steps of a) requesting, verifying, and recording unique business function adaptation requirements, and b) translating requirements into customized shared resource mapping for user interface adaptation, data validation, any special business or workflow processing required by the small business.

a) Requesting, Verifying, and Recording:

The computer system may use a requesting, verifying, and recording function to receive a request from a small business requiring to adapt the preset network mapping to its unique business services and and verify and record it for building custom shared resource mappings that match the unique business service.

The requesting, verifying, and recording step is implemented by presenting set of options to the small business for Shared Virtual App's user interface design, any special data validations required, or any special business or workflow processing required. These options may be preset options based on type of business, or all available options for a particular user interface, data type, or business/workflow process, or a custom option where the business may specify requirement using programming functions. Most requirements may be fulfilled by preset options that may be augmented time-to-time based on recorded trend to remove need for any custom options.

Example of such step may be a taxi service business specifying special geographic route mapping requirements, validation of address user interface fields or routes or traffic information, or in another instance a plumbing services business may specify requirement for photographs of required work, or a florist may require information to publish photographs and information regarding flower arrangements and requirement of order fulfillment and payment processing workflow through a third party API.

This function offers a significant benefit to the small business by enabling the small businesses to create unique shared apps relevant to their unique business functions and retain competitive advantage b) Translating into Dynamic Shared Resource Mapping:

Computing system may provide translating into dynamic shared resource mapping function for the small business to create a unique Shared Virtual App with dynamic configuration specific to its unique business functions instead of using a preset shared resource mapping.

This function may be implemented by displaying shared resource choice such as various UI, data fields, validation routines, different business workflow and transaction flows and recording the selection of combination of such resources specific and relevant for the small business function. The function may also provide UI field to the small business to record a name or a descriptive identifier of configuration for such custom shared resource mapping unique to its business function. The computing system may provide such recorded custom mapping identifier to the small business or any other small business to use such custom shared resource mapping as a preset shared resource mapping. The computing system may allow the small business to add any custom coding in a standard fourth generation coding languages such as Python or Perl. The computing system may validate and record such custom routine and associate it with custom business workflow set for the Shared Virtual App.

For example, in the preferred embodiment, Unique Business Function Adaptation screen, 340, depicts the UI and the associated flow for custom resource mapping for a unique business adaptation. Here, the particular small business offers service for "On Demand" taxi instead of a preset scheduled taxi service and hence chooses to do custom resource mapping for Shared Virtual App, "John's Taxi To Go". The screen, 340, and the partner program, 154, working with server program, 104, enables the small business to remove the shared resource associations or mappings that are not required such as "From", "On", "At" fields and associated flows, and keep or add the one's that are needed such as "To" field and associated flows. The screen and the programs also enable the small business to dynamically create custom resources shown in the screen, 340, by button "Add Custom" and receiving any custom resource information relevant for the unique business adaptation. One example of such custom field as show here is a cars display field in the mapping module that may depict on the mapping field nearby available cars based on their location codes. The screen, 340, also depicts mechanism to add a new module or workflow with combination of shared resources using button, "Add New Module". The partner computer, 154, working with APIs from server computer 104 may store these association as relational tables with associated relational keys in server database, 106, synchronized with partner database, 156. The example of the data tables is depicted in FIG. 5A, with tables SVA Preset Resource Map, 502, SVA Custom Resource Map, 503, and SVA Shared Resource Map, 504.

This function offers a significant benefit to the small business by dynamically creating resource mapping allowing flexibility and configuration power to create complex business flow and integrate external routines using simple point and click Self Learning:

Computing system may provide self learning function to analyze and record new preset shared resource mappings from custom shared resource mappings created by its small business users and associate them with specific configuration choices.

This function may be implemented by recording the custom shared resource mappings and analyzing them for commonality among the configuration choices associated with those shared resource mappings. The computing system may then utilize the shared resource mappings and record them as a preset shared resource mapping against the common configuration choices. The computing system may further display these mappings when a small business selects configuration choices associated with these preset mappings.

This function offers a significant benefit to the small business by dynamically creating resource mapping allowing flexibility and configuration power to create complex business flow and integrate external routines using simple point and click Consumer Shared App Access Consumer may utilize the computer system to access the Shared Virtual App for any small business. One example may be consumer downloads mobile app from the computer system on the mobile device platform that the consumer utilizes—for example consumer mobile app for iOS or Android from Apple App Store or Google Play respectively. In another case consumer may use the Web application of the computer system to access the Shared Virtual App using a published uniform resource locator (URL) of the Web site— for example http://www.example.com/consumer or http://www.example.com/webapp. Consumer access operation may contain steps of a) requesting and verifying, and b) recording consumer identification and choice information such as consumer device id number, any preferences for user interface or Shared Virtual App access, choice of specific small business Shared Virtual Apps or preference for group of Shared Virtual Apps, and any preference regarding selection of Shared Virtual Apps in a group of Shared Virtual Apps.

a) Requesting and Verifying:

Step of requesting and verifying is performed by displaying on the mobile app or Web application set of field where customer may enter information or set of options from which customer may choose one or many options and verifying the received information based on recorded validation logic such as numeric fields are entered for a phone number etc.

This function may be implemented similar to the requesting and verifying function as described earlier for small business registration.

b) Recording:

Step of recording is performed by programmatically reading and storing the entered information in a local data store on a mobile device or in a data store on the computer system server database. This function may be implemented using standard server access request APIs such as JSON over HTTP/HTTPS or XML over HTTP/HTTPS, or a combination of both.

For example, in the preferred embodiment, the Consumer Shared App Access Setup screen, 410, and Consumer Shared App Access screen, 402, depict the UI screens and associated operations flow. The screen, 410, and associated consumer computer program, 124, working with APIs from server computer program, 104, may request and store consumer identification and preference information. The example of the data tables is depicted in FIG. 6A, with tables Consumer Access Config, 510 and Consumer Preferences, 511. Here the location configuration or preference is stored in relational field LOCATION_ID, where as any dynamic preferences configured at run time stored in fields for PREFERNCE_ID, PREFERNCE_TYPE, and PREFRENCE_VALUE. The consumer computer program, 124, then query and select relevant Shared Virtual Apps working with APIs from server computer program, 104. The screen, 420, depicts that the computer program, 124, selects Shared Virtual App, "San Francisco Resident Info" based on zip code "75962" from the consumer location code preference.

This operation offers a significant benefit to the small business by simplifying the small business access to Shared Virtual App by needing to download only one mobile device app e.g. consumer mobile app and obviating the need to download different sets of apps for different small businesses. It also benefits by helping the consumer solve the issues of limited mobile resources, duplication of app functionalities, need for learning interactions with different apps, and security & quality issues with different apps. It further benefits the consumer by saving also on network resources and costs.

Dynamic Business Function Rendering

The computer system may utilize a dynamic business function rendering operation for the Shared Virtual App to be rendered as per the shared resource mappings based on configuration choices or business function adaptations by the small business. The dynamic business function rendering operation may include the steps of a) identifying the request by the consumer to utilize Shared Virtual App and retrieving the recorded shared resource mappings, b) translating shared resource mappings dynamically with any unique business function adaptations, and c) rendering in real-time user interface and business process flows to match the translated shared resource mappings and unique business function adaptations.

a) Identifying Request and Retrieving Shared Resource Mapping:

The computer system may use an identifying request and retrieving shared resource mapping function to uniquely identify request for a Shared Virtual App, one example for identifier being data record identifier for the Shared Virtual App that it may use further to retrieve shared resource mapping.

The step of identifying the utilization request for a unique Shared Virtual App is implemented by displaying to consumer Shared Virtual Apps, each Shared Virtual App being associated with a unique identifier recorded as described earlier. The Shared Virtual Apps may be selected for display based on consumer preferences for business type, location, specific small business relations etc. The computing system then receives the request for a particular Shared Virtual App based on consumer selection and verifies against stored data the associated unique identifier to identify and retrieve associated shared resource mappings from the data store or from the server executing a request API provided by server.

For example, the preferred embodiment, upon consumer selecting a Shared Virtual App as depicted in the screen, 420, the consumer computer program 124, may send a API request to server computer program, 104. The server computer program, 104, may then associated configuration and shared resource mappings, from the relational data tables, Consumer SVA, 513, SVA Shared Resource Map, 514, and SVA Preset Resource Map, 516, as depicted in FIG. 5B.

This function offers a significant benefit to the small business by enabling easy and instantaneous access to a new small business app functionality b) Translating Shared Resource Mappings:

The computer system may use a translating function to translate the retrieved shared resource mappings for the Shared Virtual App into different set of function codes required to carry out the instructions across different mobile device platforms or backend processing functions.

Such translation may be implemented by storing mapping of preset or custom programming options or processing/workflow options against coded functions to be executed to carry out such adaptation in real time. An example of such translation may be a simple mapping of different mobile app code required for presentation or validation of user interface screen data or a complex mapping of workflow and notification changes required to account for special order fulfillment or payment processing APIs.

For example, in the preferred embodiment, the computer program, 124, working with APIs from the server computer program 104, may retrieve executable function codes associated with a shared resource identifier. FIG. 5B depicts the data tables for Function Code Translation, 516, with data records associated shared resource identifier through relational key, RESOURCE_ID. The computer program then receives such translation of shared resource into a platform specific executable function code stored in data field FUNCTION_CODE_TRANSLATION and platform relational key PLATFORM_ID.

This function offers a significant benefit to the small business by helping the consumer with portability issue of small business app functionality across multiple device platforms as similar functions available on different platforms such as Web, iOS or Android.

c) Dynamic Rendering:

This step is implemented by dynamically executing retrieved translated code instructions for a specific device or Web platform using the standard coding language constructs. The translated code instructions include user interface, any validations, business process or workflow routines for the specific mobile or Web platform on which Shared Virtual App is being rendered.

An example may be a user interface and workflow requirement of a mapping route that may need to be displayed and consumer entered data that may need to be validated would be translated into recorded requirement identifiers in an operational sequence for showing a map, identifying the location codes, drawing the primary and alternate routes and requesting data from consumer to select one. Such requirement might be associated with a unique Shared Virtual App identifier for a unique business function as described earlier. Such sequence of the translated requirements might be then retrieved and synchronized with a mobile device app running on an iOS app as an example. Continuing with the execution in such example, mobile app program would then retrieve and execute code specific to iOS and previously associated with each translated operational sequence step wither in the code or recorded in the data store and executing them dynamically and in real-time rendering user interface and process flow uniquely associated with the Shared Virtual App.

For example, in the preferred embodiment, FIG. 4C shows the Preset Shared Virtual App Screen, 430, dynamically rendered by the consumer computer program, 124, and displayed on the consumer UI, 122. FIG. 5B depicts the data tables for Function Code Translation, 516, with data records associated shared resource identifier through relational key, RESOURCE_ID. The computer program, 124, then receives and executes the platform specific executable function code for the translation of shared resource map associated with the Shared Virtual App to dynamically or in real time render the UI and the functional flow for the Shared Virtual App. The screen, 430, shows the rendering with preset shared resource mappings of a "Taxi Service" for a Shared Virtual App, "Golden Limo Service". The computer program, 124, uses table SVA preset Resource Map, 502, to get the resource map and renders it dynamically. In FIG. 4D, the Adapted Shared Virtual App screen, 440, shows the rendering with custom shared resource mappings of a "On Demand Taxi Service" for a Shared Virtual App, "John's Taxi To Go". Here the small business has created custom mapping based on its unique business flow to remove non-relevant fields and flows such as "From" or "On", and added custom fields and resource maps for available "Cars". The computer program, 124, uses table SVA preset Resource Map, 503, to get the custom resource map, retrieves the platform specific executable code from table Function Code Translation, 516, and renders it dynamically. Similarly, FIG. 4E, shows the screen for a Public Shared Virtual App Screen, 450, for Shared Virtual App for city of San Francisco.

This function offers a significant benefit to the consumer by presenting relevant and most current user interface, specifically adapted to the unique business information and service offered by a small business and always have most current functionality available due to dynamic rendering without needing a lengthy app update.

Dynamic Data Synchronization:

The computer system may also provide a dynamic data synchronization function by recording on local data store the shared resource mappings and the translations with the associated configuration choices.

This is implemented by inserting data records in local data store upon retrieval and translation of configuration mappings and translations and associating them with the Shared Virtual App identifier. After the information is recorded in the local data store, the computing system can verify using a synchronization field to see whether the information is changed on the server by the small business. If the synchronization field value is matched on both local and remote or server data store, the computing system can conclude that the configuration and mapping information is not changed. Then, the computing system on the mobile device may utilize the recorded information to render the Shared Virtual App immediately obviating the steps for additional retrieval of mapping and translation. The computing system may implement updated time stamp for the configuration mapping as a data synchronization field between server and local data record for the Shared Virtual App. This allows the rendering to be implemented dynamically or each time when Consumer sends a request for Shared Virtual App and also keep the rendering efficient by not retrieving and translating the information for every such request if the configuration and mapping information is nor changed.

For example, in the preferred embodiment, FIG. 5B shows the tables used for data synchronization, table SVA Shared Resource Map, 514, and table SVA Preset Resource Map, 515. The computer program, 124, upon retrieving shared resource information by using APIs from the server computer program, 104, may record such data locally on the consumer device local data, 126, along with additional retrieved data for a synchronization field, shown in the table example as the SYNCHRONIZATION_FIELD. In subsequent request for access and rendering of a Shared Virtual App, the computer program, 124, may then only retrieve synchronization field first, which the server program, 104, may have kept in sync with update of particular data record using a value such as time stamp value. The computer program, 124, may then compare that retrieved data with locally stored and previously retrieved data and choose to use local data record information upon match and send a fresh request to server for the data request upon match failure.

This function offers a significant benefit to the small business by providing highly efficient update by keeping functionality dynamic but removing the need to retrieve functionality every time, thus saving on time as well as network resources and costs.

Consumer Adaptation and Dynamic Matching

The computing system may additionally provide a consumer adaptation and dynamic matching operation to display a list of only relevant Shared Virtual Apps to the consumer based on consumer preference or based on the computing system's deduction of consumer preference. The consumer adaptation and dynamic matching operation may perform the steps of a) requesting and recording consumer selection of Shared Virtual Apps, or type of Shared Virtual Apps, or preferences that would enable the computer system to match the Shared Virtual Apps to consumer preferences, or with consumer consent recording and b) analyzing consumer behavior and interactions to deduce consumer preferences, and matching them with Shared Virtual Apps.

a) Requesting and Recording:

The steps of requesting and recording as outlined earlier are performed by displaying the type of channels or channels and recording customer preferences, or displaying preset options associated with selection certain types of channels with such options, recording the options, and dynamically querying and selecting such channels associated with such options in real-time.

This function offers a significant benefit to the small business by enabling availability for different types of Virtual Shared Apps, for example private where usage may be restricted to select few or public where usage may be made available based consumer configuration choices such as zip code. It also benefits by enabling ease of access with dynamic adaptation based on consumer preferences and instantaneous matching without needing to search and request or a lengthy download.

b) Analyzing, Learning, and Matching:

The step of analyzing consumer behavior to deduce preferences is performed by associating specific behavioral steps in consumer's transaction, or interactions with preference options or preferred Shared Virtual Apps and querying from such preferences as described earlier. The computer may also perform artificial intelligence analysis step of learning such associations from the actual behavioral steps and actual preferences for a group of consumers and then applying that for smart deductions for a consumer as described earlier.

For example, in the preferred embodiment, FIG. 5B shows the database table, Consumer Behavior Analysis, 512, that may store the consumer actions associated with Shared Virtual Apps in the fields CONSUMER_ACTION_ID, CONSUMER_ACTION_TYPE, and associate an inference weight for it stored in the field CONSUMER_ACTION_WT. The computer program, 124, may the analyze the trend of the consumer behavior along with consumer preference choices, Shared Virtual App and consumer configurations, and system deduced consumer choice preferences for selection of Shared Virtual Apps or behavior in the UI and functional flows for the Shared Virtual App. FIG. 4B depicts result of such system deduction and self learning operation in the Consumer Shared App Access screen, 420. Here, the computer program, 124, may select specific Shared Virtual Apps based on combination of the consumer preference and system deduction such as "San Francisco Resident Info" shared app based on preference for location code "75962", "John's Taxi To Go" based on the small business selection of the consumer for the app, "City Yellow Cabs" based on search and selection by the consumer for the app, and "Golden Limo Service" based on system deduction by user behavior analysis of using the location of "75962" and another shared app for "Taxi Service".

This function offers a significant benefit to the small business by providing convenience and ease of use by system analysis of preferences, user or user group behavior and system analysis, deduction, and matching of most relevant Shared Virtual Apps being available to the consumer.

Small Business Customer Identification:

The consumer adaptation operation may perform additionally the steps of recording small business identification of consumers and associating the consumers with the Shared Virtual Apps based on such identified relationships. The computing system uses the unique identifier for the Shared Virtual App, along with unique identification and association information such as credentials of the small business, credentials of the consumer, user associations and standard security protocols such as standard data encrypted and HTTPS transmission protocol to enable secure sharing of the Shared Virtual App among may consumers and many small businesses without any privacy or security breaches.

This function offers a significant benefit to the small business by enabling use of restricted or private usage based on configuration of existing or target relationships of small businesses with the consumers.

Unique Advantages

Advantages for the Small Business:

No Technology Investments: A small business to offer new technology solutions compatible with their business offering would be able to configure a Shared Virtual App without having to invest in any technologies for Mobile apps.

Significant Cost Savings: Since the small business is able to configure a Shared Virtual App readily without any costs of development for the mobile apps, small business will be able to result into significant amount of cost savings.

Significant Resource Savings: The small business utilizing the technology proposed by the present invention will not need to maintain any development or maintenance personnel as well as any hardware or software by configuring and creating Shared Virtual Apps resulting in significant resource savings.

Ease of Use: With multitudes of current technologies developing and maintaining its own app is complex for a small business. The present method solves that issue by utilizing easily configurable point and click Shared Virtual Apps and provides significant ease of use for the small business so that even a person not skilled in latest technologies can easily configure and implement a Shared Virtual App.

Ease of Change and Maintenance: With its own technologies or mobile device apps, a small business will have to develop and support any new functionality changes across multiple platforms, going through time and resource consuming cycles of development, testing, and defect fixing. The use Shared Virtual Apps will solve this issue for the small business because any change in their service or business function will be supported through unique business adaptation function by simply point and click configuration changes in resource mappings. Once done these changes will be available on different technology platforms immediately through function code mappings and dynamic renderings for those platforms, making it affordable and easy for small business to change and maintain their Shared Virtual Apps.

No upgrade costs: If the small business develop and maintain their own technology or mobile device apps, they not only have to develop it on multiple platforms, but also would need to support constant upgrades that happen in technologies. This can be a very costly and time consuming affair especially for small business owners because of limited resources. The method presented solves that issue and once the small business makes the configurations, they would not have to upgrade when the device technologies upgrade or change because that will be supported through corresponding changes in recorded resource mappings, function code mappings, and rendering obviating the need for small business to make any further changes.

Time to Market: With Shared Virtual App, a small business may configure and make it services available through the Shared Virtual App in minutes significantly reducing time to market and offering a significant business opportunity for the small business as against developing its own mobile app on multiple technology platforms that may take months and run into thousands of dollars in lost opportunity costs.

Portability across different platforms: The present invention utilizes flexible shared resource mappings, function code mappings, and dynamic business function renderings to render a Shared Virtual App dynamically on different technology platforms that exists today such as iOS and Android or any new ones that may be introduced in future. This method when implemented as described offers a significant benefit to the small business to configure the Shared Virtual App and then have it used across different platforms.

Competitive Advantage with Unique Business Adaptation: The present invention not only allows the small business solution to create a Shared Virtual App in minutes and with no technology investments, but it also allows it to maintain its competitive advantage by enabling it to make the Shared Virtual App unique to its specific business functions and services and retain its differentiation in the market.

Simple, Sophisticated, and Flexible: The present invention caters to large array of small business types from those who need to have technology quickly to have their service available and promoted in the new technology age, but also for the small business that wants to develop more sophisticate technology solution from differentiated adaptation to its unique business functions to integrating its own preexisting technology or any third party technology through the custom shared resource mapping and dynamic rendering function. This offers a tremendous flexibility to a small business to how sophisticated it wants its Shared Virtual App to be even though the complexity of developing own custom apps is completely removed.

Advantages for the Consumer:

Saving Time, Resources, and Costs: The present invention enables the consumer to download the mobile device app only once and then use multiple Shared Virtual Apps offered by different small businesses through Shared Virtual Apps. This will significantly save time as well as device resources for the consumer. Especially with high device resource costs and limited resource availability on mobile devices this will be a big benefit on saving device resource costs.

Instant Availability: With the dynamic access and rendering of the Shared Virtual App as described earlier, any Shared Virtual App will be instantly available as soon as configured by small business for access and use for the consumer. This will have a significant benefit to the small business as well as consumer for not having to wait for the app to be installed and having the functionality available instantaneously without any efforts from the consumer.

Ease of Use, Efficiency and Consistent Quality: Since the shared virtual apps may use preset functionality with best practices, both the small business and consumer will benefit significantly from efficiency and ease of use respectively. The small business will have the best practices for technology and services through latest technology available at their fingertips. Also, the consumers will get the best practices from small businesses and hence higher and consistent quality experience through use of preset Shared Virtual Apps.

Self Learning Technology and Consumer Preference Adaptation: The method utilizes the self learning technology and consumer preference adaptation through recording, analyzing, and adjusting the Shared Virtual App access based on the analytical deductions and consumer preferences. This help the consumer significantly to have desired and more efficient and effective experience through dynamic access availability of the Shared Virtual Apps.

Ease of Portability across Devices and Platforms: Current technology would require the consumer to download all small business apps to downloaded, installed, and setup again when the consumer changes a mobile device. This is highly cumbersome for the consumer and creates drain on resource, time, and costs. With the Shared Virtual Apps the consumer will need to download only one app and all the Shared Virtual Apps associated with consumer's account will be available instantaneously and will be a significant benefit to the consumer maintaining continuity seamlessly.

No lengthy and costly app updates: With Shared Virtual Apps dynamic rendering function, the consumer will always have latest functionality available without needing a lengthy and resource intensive app update.

Efficient Synchronization: The method described for Shared Virtual App synchronization Provides a dynamic but highly efficient update of the functionality, removing the need to retrieve functionality every time but only when changed, thus saving on time as well as network resources and costs.

CONCLUSIONS, RAMIFICATIONS, AND SCOPE

Although the description above contains many specifications, these should not be construed as limiting the scope of the invention but as merely providing illustrations of some of the presently preferred embodiments of this invention. The scope of the invention should be determined by the appended claims and their legal equivalents, rather than by the examples given.

The invention claimed is:

1. A method provided by a non-transitory computer-readable medium for secure sharing of a mobile app for a small business with unique business function adaptation and rendering, implementing the steps of:
   (a) requesting, verifying, and recording in a system data store, information from the small business comprising login credentials and business identification information;
   (b) requesting, verifying, and recording configuration information of a shared virtual app comprising name and a plurality of information fields related to services offered by the shared virtual app, and recording an identification number to be associated with the shared virtual app identifying the shared virtual app uniquely;
   (c) recording information of a plurality of shared resources associated with the said configuration information of the shared virtual app, the said information of the plurality of shared resources being information required for rendering resources for the shared virtual app;
   (d) requesting and recording a consumer's identification and a plurality of preferences used in determining access privileges for a plurality of shared virtual apps (e) identifying a request by the consumer for the shared virtual app that is identified by the identification number;
(i) retrieving the configuration information associated with the identification number of the shared app, and retrieving the said information of the plurality of shared resources associated with the configuration information;
(g) translating the said information of the plurality of share resources into a device or a technology platform specific-executable code;
(h) executing the device or the technology platform specific code to render the shared virtual app by rendering the said information of the plurality of shared resources associated with the shared virtual app.

2. The method of claim 1, further comprising:
in addition to recording the said configuration information of the shared virtual app, recording a user or a user type information for the shared virtual app.

3. The method of claim 1, further comprising:
in addition to recording the said configuration information, recording a usage rights information for the shared virtual app specifying access rights of any additional service providers of the shared virtual app.

4. The method of claim 1, further comprising:
recording the said information of the plurality of shared resources associated with the configuration information of the shared virtual app from a set of a plurality of prerecorded or preset shared resource associations with a prerecorded configuration information.

5. The method of claim 1, further comprising:
recording the said information of the plurality of shared resources associated with the configuration information of the shared virtual app by requesting from the small business information of a plurality of custom shared resources and recording information of the said plurality of custom shared resources in addition to or in lieu of the said configuration information of a shared virtual app, making the information of the said plurality of custom shared resources specific to a unique business operation provided by the small business.

6. The method of claim 5, further comprising:
recording information of the said plurality of custom shared resources as a prerecorded or preset shared resource.

7. The method of claim 1, further comprising:
recording the retrieved configuration information associated with identification number of the shared app and the said information of the plurality of shared resources with a synchronization data field on the system data store and a device data store locally and subsequently for the said request by the consumer for the shared virtual app retrieving only the synchronization data field from the system data store first and compare the retrieved synchronization data field from the system data store it with the synchronization field recorded on the device data store locally and upon failure of the verification, retrieving the said configuration information of the shared virtual app and the said information of the plurality of shared resources dynamically.

8. The method of claim 1, further comprising:
recording a plurality of requests by the consumer in using the shared virtual app and analyzing the recorded plurality of requests and the recorded preferences in determining access privileges for the shared virtual app.

* * * * *